United States Patent
Chromy et al.

(10) Patent No.: US 9,920,944 B2
(45) Date of Patent: Mar. 20, 2018

(54) WALL MODULE DISPLAY MODIFICATION AND SHARING

(71) Applicant: Honeywell International Inc., Morristown, NJ (US)

(72) Inventors: Ivo Chromy, Rajhrad (CZ); Miroslav Mikulica, Brno (CZ); David Sedlacek, Zdar nad Sazavou (CZ); Petr Hanel, Chocen (CZ); Gary P. Kasper, Champlin, MN (US); William Bray, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 312 days.

(21) Appl. No.: 14/662,489

(22) Filed: Mar. 19, 2015

(65) Prior Publication Data
US 2016/0273793 A1  Sep. 22, 2016

(51) Int. Cl.
*G01M 1/38* (2006.01)
*G05B 13/00* (2006.01)
(Continued)

(52) U.S. Cl.
CPC ........ *F24F 11/006* (2013.01); *F24F 11/0012* (2013.01); *F24F 11/0015* (2013.01);
(Continued)

(58) Field of Classification Search
CPC ............... F24F 11/0012; F24F 11/0015; F24F 11/0017; F24F 11/0076; F24F 11/0086; G05B 15/02; H04L 12/2803
(Continued)

(56) References Cited

U.S. PATENT DOCUMENTS 3,058,484 A  10/1962 Feiring
3,107,685 A  10/1963 Scaramucci
(Continued)

FOREIGN PATENT DOCUMENTS

EP  1008817  6/2000
EP  1380909  1/2004
(Continued)

OTHER PUBLICATIONS

Alerton Technologies, Inc., "BACtalk Microset II Wall Unit, Product Nos. MS-2000-BT & MS-2000H-BT (with Optional Humidity Sensor)," 2 pages, 1999.
(Continued)

*Primary Examiner* — Robert Cassity
(74) *Attorney, Agent, or Firm* — Seager, Tufte & Wickhem, LLP

(57) ABSTRACT

A wall module for controlling a temperature in a building space includes a housing and a temperature sensor disposed within the housing. A touch screen display is mounted relative to the housing and a controller is configured to control what is displayed on the touch screen display and to accept inputs received via the touch screen display. A communication port is operatively coupled to the controller for communicating with an HVAC controller that is remote from the wall module. The controller is configured to permit a user to alter a display arrangement of information displayed on the touch screen display, and to transmit the altered display arrangement to the HVAC controller such that the HVAC controller can subsequently provide the altered display arrangement back to the wall module and/or share the altered display arrangement with other wall modules.

23 Claims, 11 Drawing Sheets

(51) Int. Cl.
   *G05B 15/00*    (2006.01)
   *F24F 11/00*    (2018.01)
   *G05B 15/02*    (2006.01)
   *H04L 12/28*    (2006.01)

(52) U.S. Cl.
   CPC ...... *F24F 11/0017* (2013.01); *F24F 11/0076* (2013.01); *F24F 11/0086* (2013.01); *G05B 15/02* (2013.01); *H04L 12/2803* (2013.01); *F24F 2011/0061* (2013.01); *F24F 2011/0067* (2013.01); *F24F 2011/0068* (2013.01); *F24F 2011/0091* (2013.01)

(58) Field of Classification Search
   USPC .......................................................... 700/278
   See application file for complete search history.

(56) References Cited

U.S. PATENT DOCUMENTS

| | | | |
|---|---|---|---|
| 3,132,836 A | 5/1964 | Dickerson et al. |
| 3,150,681 A | 9/1964 | Hansen et al. |
| 3,179,121 A | 4/1965 | Bredtschneider et al. |
| 3,198,477 A | 8/1965 | Allenbaugh, Jr. |
| 3,743,242 A | 7/1973 | Scarmucci |
| 4,562,860 A | 1/1986 | Walter et al. |
| 4,606,368 A | 8/1986 | McCafferty |
| 4,654,653 A | 3/1987 | Brindle et al. |
| 4,721,870 A | 1/1988 | Rector et al. |
| 4,723,513 A | 2/1988 | Vallett et al. |
| 4,784,580 A | 11/1988 | Takata et al. |
| 4,793,800 A | 12/1988 | Vallett et al. |
| 5,449,319 A | 9/1995 | Dushane et al. |
| 5,479,812 A | 1/1996 | Juntunen et al. |
| 5,605,280 A | 2/1997 | Hartman et al. |
| 5,689,669 A | 11/1997 | Lynch et al. |
| 5,778,368 A | 7/1998 | Hogan et al. |
| 5,801,942 A | 9/1998 | Nixon et al. |
| 5,944,054 A | 8/1999 | Saieva |
| 5,989,020 A | 11/1999 | Glass et al. |
| 6,008,805 A | 12/1999 | Land et al. |
| 6,134,853 A | 10/2000 | Haener |
| 6,157,943 A | 12/2000 | Meyer |
| 6,272,400 B1 | 8/2001 | Jankins et al. |
| 6,330,806 B1 | 12/2001 | Beaverson et al. |
| 6,366,300 B1 | 4/2002 | Ohara et al. |
| 6,428,312 B1 | 8/2002 | Smelcer et al. |
| 6,453,687 B2 | 9/2002 | Sharood et al. |
| 6,536,678 B2 | 3/2003 | Pouchak |
| 6,549,826 B1 | 4/2003 | Pouchak et al. |
| 6,615,404 B1 | 9/2003 | Garfunkel et al. |
| 6,618,430 B1 | 9/2003 | Khaleghi et al. |
| 6,619,951 B2 | 9/2003 | Bodnar et al. |
| 6,687,698 B1 | 2/2004 | Nixon et al. |
| 6,694,926 B2 | 2/2004 | Baese et al. |
| 6,741,915 B2 | 5/2004 | Poth |
| 6,745,085 B2 | 6/2004 | Pouchak |
| 6,754,885 B1 | 6/2004 | Dardinski et al. |
| 6,832,120 B1 | 12/2004 | Frank et al. |
| 6,851,621 B1 | 2/2005 | Wacker et al. |
| 6,867,749 B1 | 3/2005 | Il et al. |
| 6,934,762 B1 | 8/2005 | Lange et al. |
| 6,934,862 B2 | 8/2005 | Sharood et al. |
| 6,954,906 B1 | 10/2005 | Kamachi et al. |
| 6,996,600 B2 | 2/2006 | Gagner et al. |
| 7,025,281 B2 | 4/2006 | DeLuca |
| 7,028,912 B1 | 4/2006 | Rosen |
| 7,043,311 B2 | 5/2006 | Nixon et al. |
| 7,047,092 B2 | 5/2006 | Wimsatt |
| 7,055,759 B2 | 6/2006 | Wacker et al. |
| 7,071,727 B2 | 7/2006 | Ganton |
| 7,083,109 B2 | 8/2006 | Pouchak |
| 7,089,530 B1 | 8/2006 | Dardinski et al. |
| 7,114,554 B2 | 10/2006 | Bergman et al. |
| 7,120,908 B1 | 10/2006 | Klimchynski |
| 7,124,163 B2 | 10/2006 | Geofroy et al. |
| 7,124,205 B2 | 10/2006 | Craft et al. |
| 7,188,779 B2 | 3/2007 | Alles |
| 7,222,800 B2 | 5/2007 | Wruck |
| 7,225,054 B2 | 5/2007 | Amundson et al. |
| 7,225,426 B2 | 5/2007 | Frank et al. |
| 7,269,646 B2 | 9/2007 | Yamamoto et al. |
| 7,272,815 B1 | 9/2007 | Eldridge et al. |
| 7,283,816 B2 | 10/2007 | Fok et al. |
| 7,505,817 B2 | 3/2009 | McDaniel et al. |
| 7,529,650 B2 | 5/2009 | Wakelam et al. |
| 7,627,385 B2 | 12/2009 | McGreevy et al. |
| 7,693,583 B2 | 4/2010 | Wolff et al. |
| 7,706,923 B2 | 4/2010 | Amundson et al. |
| 7,784,705 B2 | 8/2010 | Kasper et al. |
| 7,819,334 B2 | 10/2010 | Pouchak et al. |
| 7,904,074 B2 | 3/2011 | Karaoguz et al. |
| 8,055,743 B2 | 11/2011 | Frutiger et al. |
| 8,429,566 B2 | 4/2013 | Koushik et al. |
| 8,538,588 B2 | 9/2013 | Kasper |
| 8,925,358 B2 | 1/2015 | Kasper |
| 2002/0152298 A1 | 10/2002 | Kikta et al. |
| 2003/0046557 A1 | 3/2003 | Miller et al. |
| 2003/0150926 A1* | 8/2003 | Rosen ............... G05D 23/1905 236/51 |
| 2003/0158975 A1 | 8/2003 | Frank et al. |
| 2004/0144849 A1 | 7/2004 | Ahmed |
| 2004/0260427 A1 | 12/2004 | Wimsatt |
| 2005/0040250 A1 | 2/2005 | Wruck |
| 2005/0131991 A1 | 6/2005 | Ogawa et al. |
| 2005/0204020 A1 | 9/2005 | O'Brien et al. |
| 2006/0159007 A1 | 7/2006 | Frutiger et al. |
| 2006/0253205 A1 | 11/2006 | Gardiner |
| 2007/0045444 A1 | 3/2007 | Gray et al. |
| 2007/0200004 A1 | 8/2007 | Kasper et al. |
| 2008/0004725 A1 | 1/2008 | Wacker |
| 2008/0048046 A1 | 2/2008 | Wagner et al. |
| 2008/0157600 A1 | 7/2008 | Marlenee et al. |
| 2009/0057427 A1* | 3/2009 | Geadelmann ......... G05B 15/02 236/51 |
| 2009/0158188 A1* | 6/2009 | Bray .................. F24F 11/001 715/771 |
| 2010/0050075 A1 | 2/2010 | Thorson et al. |
| 2010/0070089 A1 | 3/2010 | Harrod et al. |
| 2010/0100829 A1 | 4/2010 | Laberge et al. |
| 2010/0245259 A1 | 9/2010 | Bairagi et al. |
| 2011/0010660 A1 | 1/2011 | Thorson et al. |
| 2012/0131504 A1* | 5/2012 | Fadell ................. F24F 11/0086 715/810 |
| 2012/0296488 A1 | 11/2012 | Dharwada et al. |
| 2013/0311883 A1 | 11/2013 | McCoy et al. |
| 2014/0151456 A1 | 6/2014 | McCumin et al. |
| 2014/0310739 A1* | 10/2014 | Ricci .................. H04W 48/04 725/28 |
| 2015/0067562 A1 | 3/2015 | Sasaki et al. |
| 2015/0254799 A1* | 9/2015 | Grinberg ............. G06F 9/4443 345/531 |

FOREIGN PATENT DOCUMENTS

| | | |
|---|---|---|
| GB | 2257538 | 1/1993 |
| GB | 2262625 | 6/1993 |
| JP | 2001117810 | 4/2001 |
| WO | 2003067457 A1 | 8/2003 |

OTHER PUBLICATIONS

Alerton, "BACtalk Microset II," Installation and Operations Guide, 32 pages, 1999.

Aube, Drawings of Circuits 1 and 2, 2 pages, Date of Public Use or Disclosure Not Yet Determined as of May 28, 2008.

Carrier Corporation, "3V Control System, System Pilot, Part No. 33PILOT-01," Product Specification, 4 pages, Sep. 2004.

Carrier, "System Pilot, Part No. 33PILOT-01," Installation and Operation Instructions, 20 pages, 2004.

Carrier, "System Pilot, Part No. 33PILOT-01," Owner's Manual, 8 pages, 2004.

(56) References Cited

OTHER PUBLICATIONS

Central and Southwest Communications, "Customer Choice and Control Thermostat Touchpad," User Guide, 15 pages, May 1996.
Delta Controls, "HVAC, Network Sensors BACstatII: DNS-24/H24," 2 pages, Oct. 2004.
Echelon, "ShortStack Developer's Kit Model 23400," 3 pages, 2002.
Echelon, "Echelon ShortStack Micro Server Answers to Frequently Asked Questions," pp. 1-5, Apr. 2002.
Echelon, "Introduction to the LonWorks System, Version 1.0," 73 pages, 1999.
Echelon, "ShortStack Overview," 12 pages, prior to Nov. 29, 2006.
Echelon, "ShortStack User's Guide, Version 2" 152 pages, Mar. 2002.
Honeywell, "Command Display S7760A EPROM Replacement," Installation Instructions, 2 pages, 2002.
Honeywell, "Command Display S7760A," User Guide, 41 pages, Feb. 2000.
Honeywell, "Excel 15 S7760A Command Display," Installation Instructions, 8 pages, Feb. 1999.
Honeywell, "Excel 15 S7760A Command Display," Specification Data, 2 pages, Nov. 1998.
Honeywell, "FocusPRO TH6000 Series, Installation Guide," 16 pages, Mar. 2006.
Honeywell, "FocusPro TH6320R Wireless Thermostat," Operating Manual, 62 pages, Jul. 2008.
Honeywell, "PVL6436A, PVL6438N, PUL6438 Programmable VAV/Unitary Controllers," Installation Instructions, 24 pages, Dec. 2006.
Honeywell, "S7340A System User Interface," Specification Data, 2 pages, Nov. 1999.
Honeywell, "S7760A Command Display for RapidZone Solution," 12 pages, Feb. 2001.
Honeywell, "T7525A and T7526A Thermostat Touchpads," 6 pages, Oct. 1994.
Honeywell, "T7525A/T7526A Thermostat Touchpad," User Guide, 12 pages, May 1995.
Honeywell, "T7560A,B, Digital Wall Module," Specification Data, 8 pages, May 1999.
Honeywell, "T7560A,B,C Digital Wall Module," Installation Instructions, 8 pages, 2003.
Honeywell, "T7770A,B,C,D,E,F,G, Wall Modules, Excel 5000 Open System," Specification Data, 4 pages, May 1997.
Honeywell, "TB8220 Commercial VisionPro Programmable Thermostat VisionPro 8000 Touchscreen," Product Data, 24 pages, Dec. 2006.
Honeywell, "TB8220U Commercial VisionPRO Programmable Thermostat," Installation Instructions, 16 pages, Jan. 2008.
Honeywell, "TR70 and TR70-H LCD Wall Modules," Installation Instructions, 4 pages, Apr. 2008.
Honeywell, "Zio LCD Wall Modules TR70 and TR70-H with Sylk Bus," Operating Guide, 28 pages, Oct. 2008.
Honeywell, "Zio LCD Wall Modules TR70 and TR70-H with Sylk Bus," Specification Data, 4 pages, Oct. 2008.
Invensys, "Micronet Sensors, DS 10.000, MN Sx Series, Data Sheets," 4 pages, Mar. 2003.
Invensys, "Micronet Sensors, MN-SXXX Series," 4 pages, Mar. 2002.
Johnson Controls, Inc., "Room Sensor with LCD Display (TMZ1600)," Installation Instructions, 14 pages, Apr. 12, 2006.
Johnson Controls, Inc., "TMx1600 Room Sensor with LCD Display," Product Bulletin, 4 pages, Jan. 2001.
Johnson Controls, Inc., "TMx1600 Room Sensor with LCD Display," Product Bulletin, 4 pages, Jul. 20, 2006.
Reliable Controls, "Smart-Sensor LCD, Mach System" 1 page, 2006.
Reliable Controls, "Smart-Sensor LCD," 2 pages, 2006.
Robertshaw, "Deluxe Programmable Thermostat, Models 9801i," 2 pages, Aug. 2003.
Robertshaw, "Deluxe Programmable Thermostats, Models 9801i, 9815i and 9820i, Quick Start Installation Manual," 2 pages, prior to Dec. 14, 2007.
Robertshaw, "Deluxe Programmable Thermostats, Models 9801i, 9815i and 9820i," User's Manual, 28 pages, Jul. 2004.
Robertshaw, "Deluxe Programmable Thermostats, Models 9815i," 2 pages, Aug. 2003.
Robertshaw, "Deluxe Programmable Thermostats, Models 9820i," 2 pages, Aug. 2003.
Trane, "Digital Display Zone Sensor," 2 pages, 2002.
Trane, "Digital Display Zone Sensor," 2 pages, 2004.
Trane, "Operating Instructions," 1 page, prior to Oct. 16, 2008.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.
Extended European Search Report for EP Application No. 16159258.9, dated Nov. 18, 2016.
Wikipedia, "Roaming User Profile," 9 pages, downloaded from https://en.wikipedia.org/w/index.php?title=Roaming_user_profile&oldid=648578174, downloaded on Jul. 22, 2016.
Honeywell, "Thor VX9 Vehicle-Mount Computer, Reference Guide," 228 pages, Oct. 2012.
"LonMark Functional Profile: VAV Controller (VAV)," pp. 1-19, 1996.

\* cited by examiner

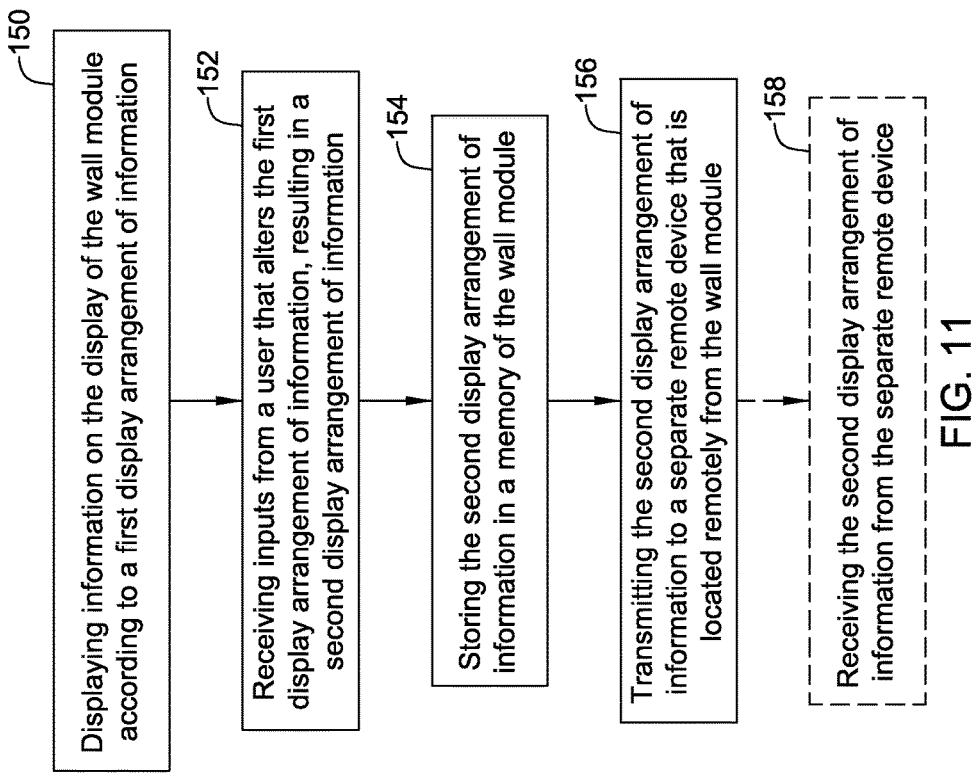

US 9,920,944 B2

WALL MODULE DISPLAY MODIFICATION AND SHARING

TECHNICAL FIELD

The disclosure relates generally to building automation systems that include wall modules, and more particularly to wall modules that permit a user to customize the information displayed by the wall modules.

BACKGROUND

A variety of building automation systems are used to control building systems such as HVAC systems, lighting systems, security systems and the like. Many building automation systems include wall modules that serve as a local user interface for the building automation system. In an HVAC system, for example, a building may include a plurality of wall modules. Each of the wall modules may or may not include a temperature sensor to enable the wall module to report an ambient temperature back to an HVAC controller that may be remote from the wall module. In any event, the wall modules may be configured to present information to a user and/or to accept input from the user. In one example, a wall module may permit a user to enter or change a desired temperature setpoint, and to display both the temperature setpoint and an ambient temperature. Depending on the application and/or user preferences, wall modules may be configured to display a variety of parameters.

There is a desire for a wall module that permits a user to choose for themselves which parameters are displayed and/or how they are displayed. There is a desire for a building automation system that permits such customization of wall modules, and stores customization information remotely so that the customization information can be downloaded to the wall module should the wall module be replaced with a new wall module, and/or shared with other wall modules.

SUMMARY

The disclosure pertains to wall modules that permit customization, as well as to building automation systems utilizing such wall modules. The wall modules may be part of an HVAC system, a lighting system, a security systems and/or any other suitable building automation system. In one example, a wall module may be part of an HVAC system and may be used for controlling a temperature in a building space. The example wall module may include a housing and sometimes a temperature sensor disposed within the housing. A touch screen display may be mounted relative to the housing and a controller may be configured to control what is displayed on the touch screen display and to accept inputs received via the touch screen display. A communication port may be operatively coupled to the controller for communicating with an HVAC controller that is remote from the wall module. The controller of the wall module may be further configured to permit a user to alter a display arrangement of information displayed on the touch screen display, and to transmit the altered display arrangement to the HVAC controller such that the HVAC controller can store the altered display arrangement and/or provide the altered display arrangement back to the wall module when desired. While a touch screen display is used in this example, it is contemplated that the display may be a non-touch screen display in combination with a set of buttons located adjacent to the display.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 11 is a flow diagram showing an illustrative method that may be carried out in accordance with an embodiment of the disclosure.

Figure 1:
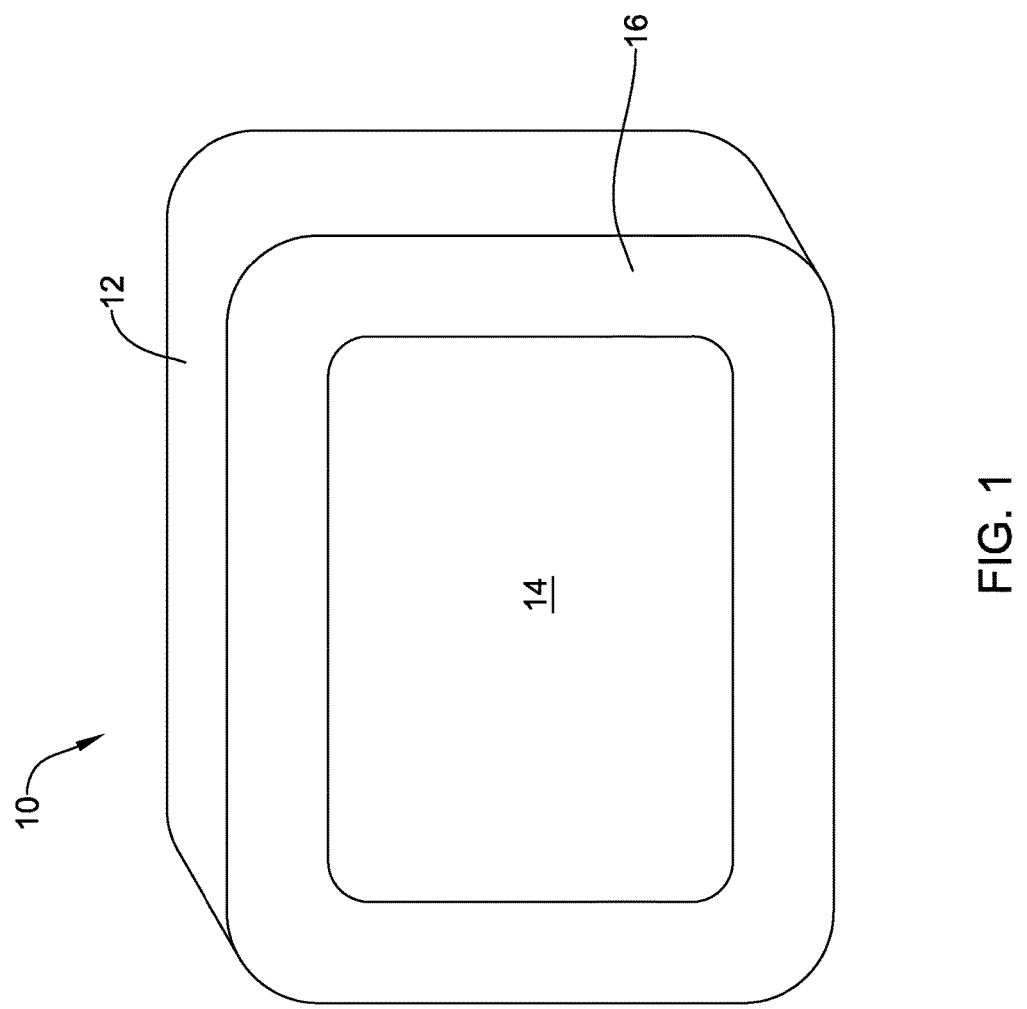
FIG. 1 is a perspective view of an illustrative wall module in accordance with an embodiment of the disclosure.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the claimed disclosure.

FIG. 1 provides a perspective view of an illustrative wall module 10. In some instances, the wall module 10 includes a housing 12 that may be suitable for mounting on a wall or other vertical surface, as well as a touch screen display 14 that is disposed to be viewable from a front face 16 of the wall module 10. While a touch screen display 14 is used in this example, it is contemplated that the display 14 may be a non-touch screen display in combination with one or more input devices (not shown) suitable for accepting inputs from a user. The wall module 10 may be configured to be used in combination with any variety of building automation systems, including but not limited to, HVAC systems, lighting control systems, security systems, fire control systems and the like. In some embodiments, a building automation system may include a plurality of wall modules that cooperate with a building automation system controller to regulate operation of the building automation system.

In one example, if the building automation system is an HVAC system, the wall module 10 may cooperate with an HVAC controller that may be remote from the wall module 10. In some cases, the wall module 10 may report an ambient temperature back to the HVAC controller, which may then in turn regulate the operation of one or more pieces of HVAC equipment in accordance with, for example, a programmed schedule residing within the HVAC controller. The wall module 10 may display user information for an individual to read, and may accept inputs from the individual, such as a temperature setpoint change. The wall module 10 may relay inputs back to the HVAC controller. In some cases, the wall module 10 may function in combination with an HVAC controller, but may not function as an HVAC controller itself.

It will be appreciated that any variety of information may be displayed on the touch screen display 14. Individual elements or pieces of information may be referred to as information objects. For example, if the wall module 10 is configured to be used with a security system, the wall module 10 may be configured to display icons representing the views of specific cameras, or perhaps icons representing particular locks or the like. These camera icons and/or lock icons may be considered to be information objects that are displayed on the touch screen display 14, and their display on the touch screen display 14 may be modified, as will be discussed with respect to subsequent drawings. In another example, if the wall module 10 is configured to be used with a lighting control system, the wall module 10 may be configured to display lighting icons that represent varying lighting combinations. These lighting icons may be considered to be information objects. In yet another example, if the wall module 10 is configured to be used in with an HVAC control system, the wall module 10 may be configured to display a variety of different things, including ambient temperature values, humidity values, time of day, temperature setpoints, ventilation settings, system settings, system status, and the like. Each of these things may be considered to be information objects.

Figure 2:
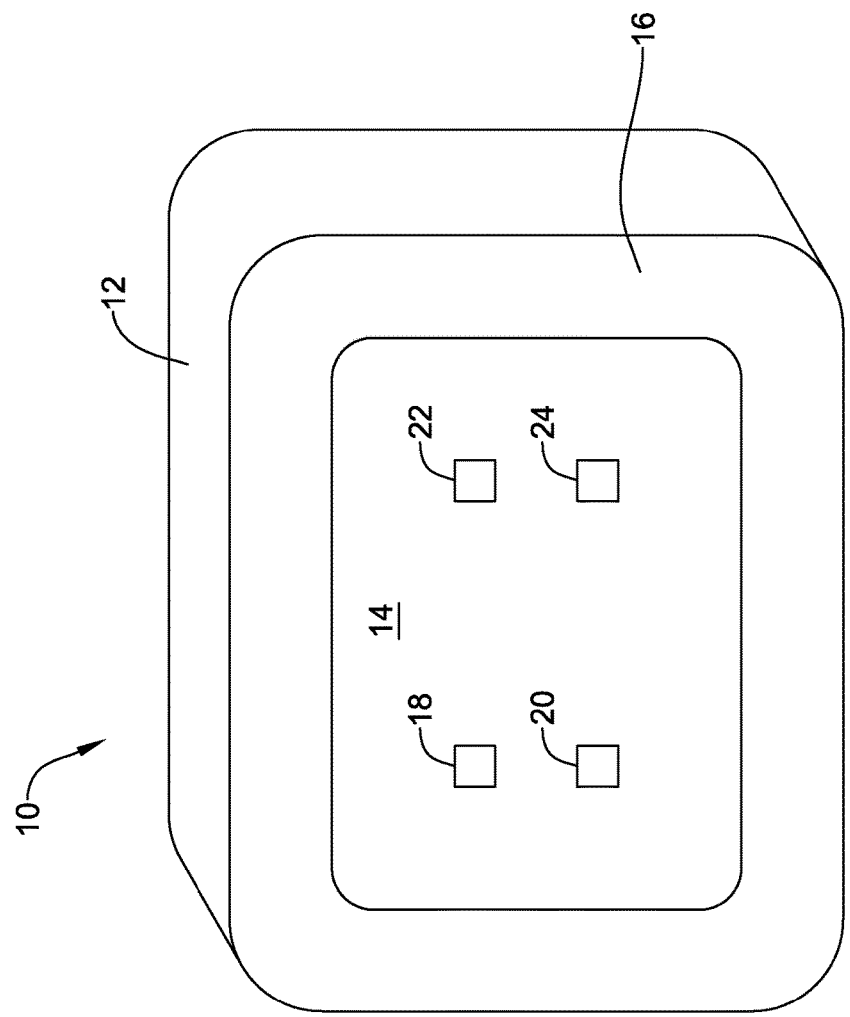
FIG. 2 is a perspective view of the illustrative wall module of FIG. 1, illustrating several information objects displayed on the display.

FIG. 2 is a perspective view of the wall module 10, illustrating several information objects displayed on the touch screen display 14. As illustrated, a total of four information objects are displayed, including an information object 18, an information object 20, an information object 22 and an information object 24. While a total of four information objects are displayed, it will be appreciated that this is merely illustrative, as any number of information objects may be displayed simultaneously on the touch screen display 14, limited only by the available display space on the touch screen display 14 and/or any preferences selected by an individual. As noted above, the wall module 10 may be configured to permit an individual to customize which information objects are displayed, and how and/or where these information objects are displayed on the display.

Figure 3:
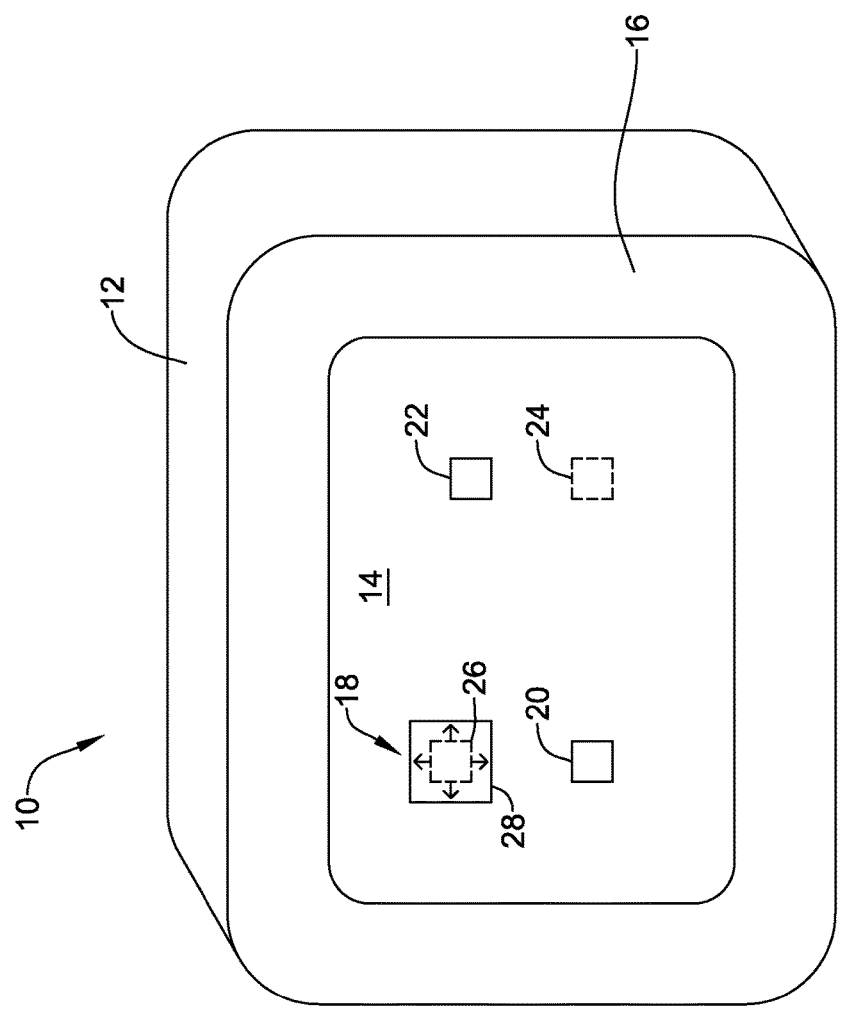
FIG. 3 is a perspective view of the illustrative wall module of FIG. 2, illustrating changes to several of the information objects displayed on the display.

In FIG. 3, it can be seen that the information object 18 has been enlarged by the user, as its original size, denoted in phantom as object 26, is now denoted as object 28. The information object 24 has been deleted, and is now seen only in phantom. In the illustrated embodiment, the information object 20 and the information object 22 are thus far unchanged. In some cases, an information object such as the information object 18 may be enlarged using a pinch gesture on the touch screen display. An information object such as the information object 24 may be deleted, for example, by double touching on the information object 24. In some cases, an information object such as the information object 24 may be deleted by single touching on the information object 24, thereby pulling up a drop-down menu giving the individual options as to what they want to do with the information object 24. In some cases, an information object may also be made larger, or made smaller, by selecting the appropriate option from a pull-down menu.

Figure 4:
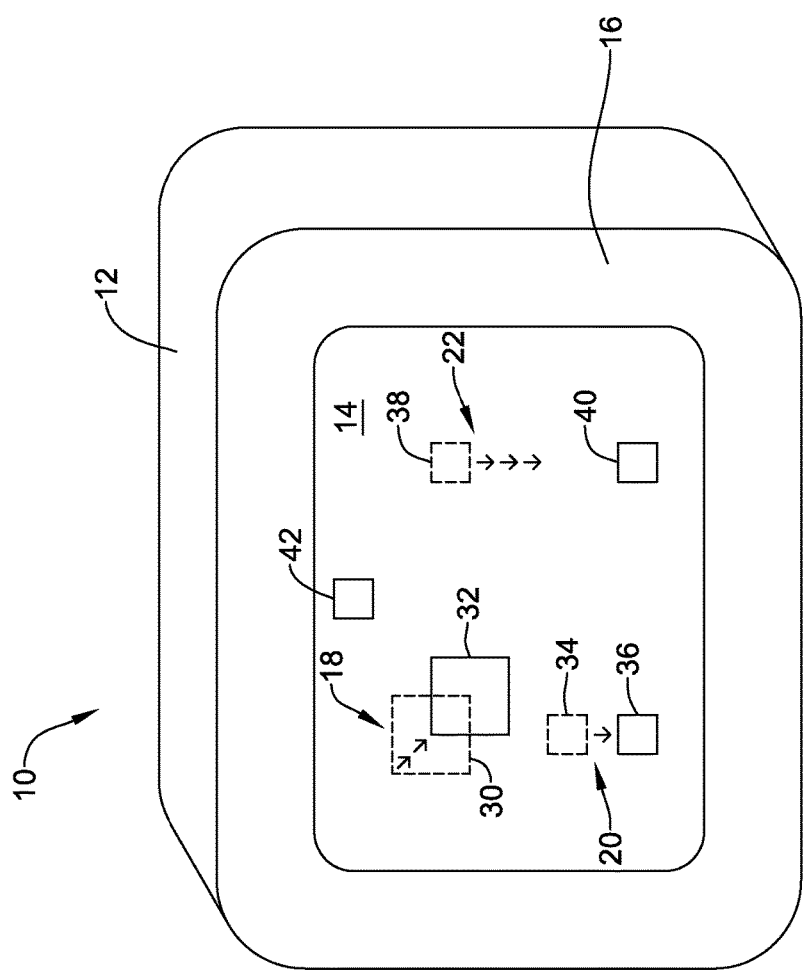
FIG. 4 is a perspective view of the illustrative wall module of FIG. 3, illustrating further changes to several of the information objects displayed on the display.

Additional changes are illustrated in FIG. 4. In FIG. 4, the information object 18, previously enlarged, has now been moved from its previous position, denoted in phantom as object 30, to a more central position on the display and is denoted as object 32. In some embodiments, an information object such as the information object 18 may be moved by a drag-n-drop gesture on the display, or by selecting an appropriate option on a pull-down menu. Similarly, the information object 20 has been moved from its original position, denoted in phantom as object 34, to a new position denoted as object 36. Also, the information object 22 has been moved from its original position, denoted in phantom as object 38, to a new position denoted as object 40. It will be appreciated that these moves are merely illustrative, as any combination of re-sizings, deletions and movements may be accommodated.

In some embodiments, additional information objects may be added. For example, in FIG. 4, a new information object 42 has been added. An information object such as the information object 42 may be added, for example, by touching somewhere on the touch screen display 14 in order to access a pull-down menu that may provide a list of available information objects. Once a new information object has been added, it can subsequently be moved, resized or deleted, just as with any of the other information objects.

Figure 5:
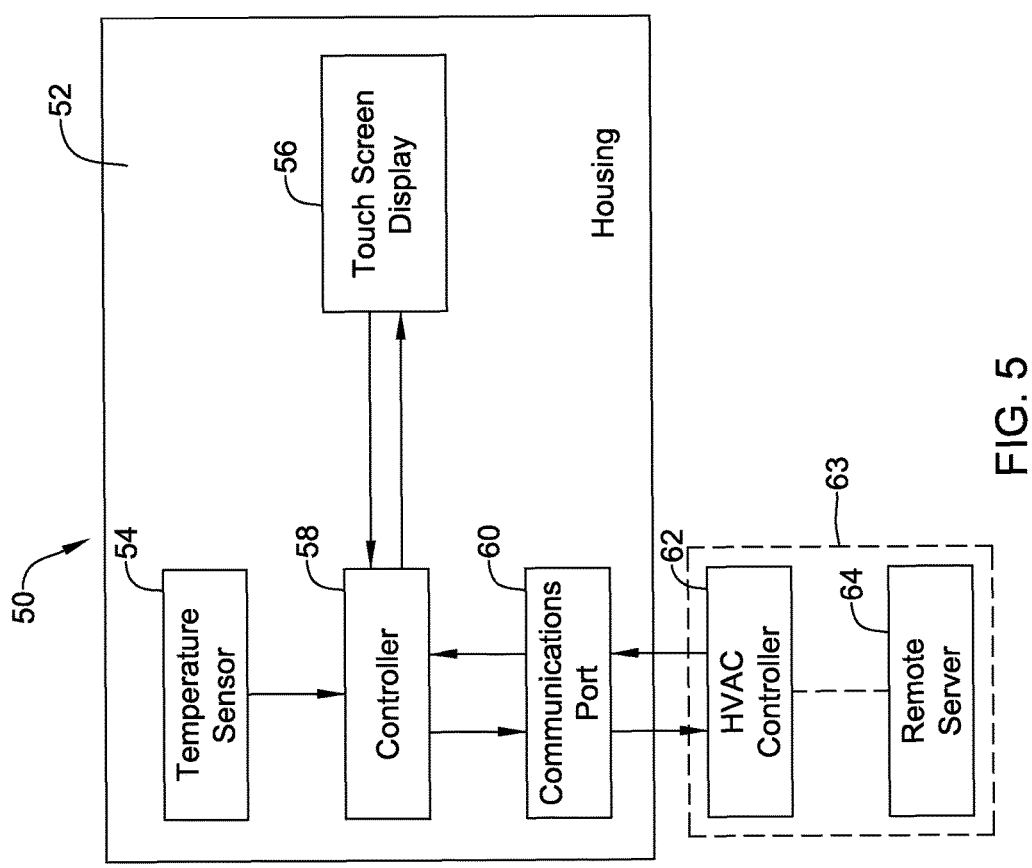
FIG. 5 is a schematic diagram of an illustrative wall module for controlling a temperature in a building space in accordance with an embodiment of the disclosure.

FIG. 5 provides a schematic diagram of an illustrative wall module 50 that may be considered as representing the wall module 10, although this is not required. The illustrative wall module 50 may be configured for controlling a temperature in a building space. The illustrative wall module 50 includes a housing 52 and a temperature sensor 54 that is disposed within the housing 52. In other embodiments, the wall module 50 may be configured for other purposes, and thus may include one or more of a temperature sensor, a humidity sensor, a carbon dioxide sensor, a carbon monoxide sensor, a volatile organic compound sensor, a light sensor, a movement sensor or a security sensor. A touch screen display 56 is mounted relative to the housing 52. In some embodiments, a controller 58 is configured to control what is displayed on the touch screen display 56 and to accept inputs received via the touch screen display 56. A communications port 60 may be operably coupled to the controller 58 such that the wall module 50 is able to communicate with an HVAC controller 62 that is remote from the wall module 50. It will be appreciated that in some cases, a single HVAC controller 62 may be in communication with a plurality of individual wall modules such as the wall module 50.

In some embodiments, the controller 58 is also configured to permit a user to alter a display arrangement of information displayed on the touch screen display 56, and to transmit the altered display arrangement to the HVAC controller 62 such that the HVAC controller 62 can subsequently provide the altered display arrangement back to the wall module 50 and/or to another wall module, as desired. In some cases, the HVAC controller 62 may share the altered display arrangement with a remote server 64. The remote server 64 may, for example, provide the altered display arrangement back to the HVAC controller 62 and/or the wall module 50 at a future date, and/or may share the altered display arrangement with other HVAC controllers and/or wall modules, if desired. In some cases, the HVAC controller 62 and remote server 64 may be considered an HVAC controller, as indicated by dashed line 63, but this is not required.

Figure 6:
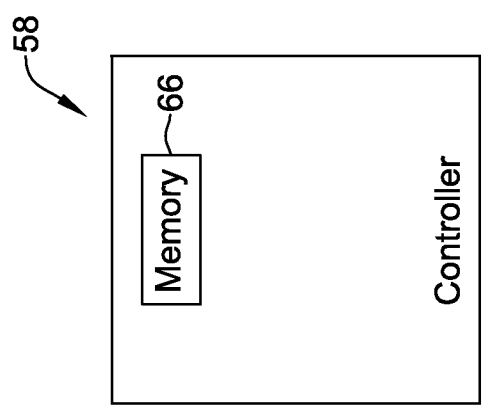
FIG. 6 is a schematic illustration of a portion of the illustrative wall module of FIG. 5.

In some embodiments, as shown in FIG. 6, the controller 58 may include a memory 66 that may be configured to store a display arrangement and/or an altered display arrangement. In some cases, the memory 66 may store one or more display tables that include display attributes relating to each of the one or more information objects (such as the information objects 18, 20, 22 and 24 shown in FIG. 2) that are to be displayed. These display attributes may, for example, include information pertaining to display size for each of the information objects, display position for each of the information objects and/or other preferences that may have been indicated by the individual, such as font, color, etc.

Returning to FIG. 5, in some cases, the controller 58 of the wall module 50 may be configured to receive an initial display arrangement from the HVAC controller 62 upon initial power up of the wall module 50, such as when the wall module 50 is originally installed or replaced, or perhaps after a power failure if no customization has previously occurred. Once the original display arrangement has been altered, and an altered display arrangement has been transmitted from the wall module 50 to the HVAC controller 62, the HVAC controller 62 may subsequently transmit the altered display arrangement back to the wall module 50 upon power resumption and/or wall module replacement.

Figure 7:
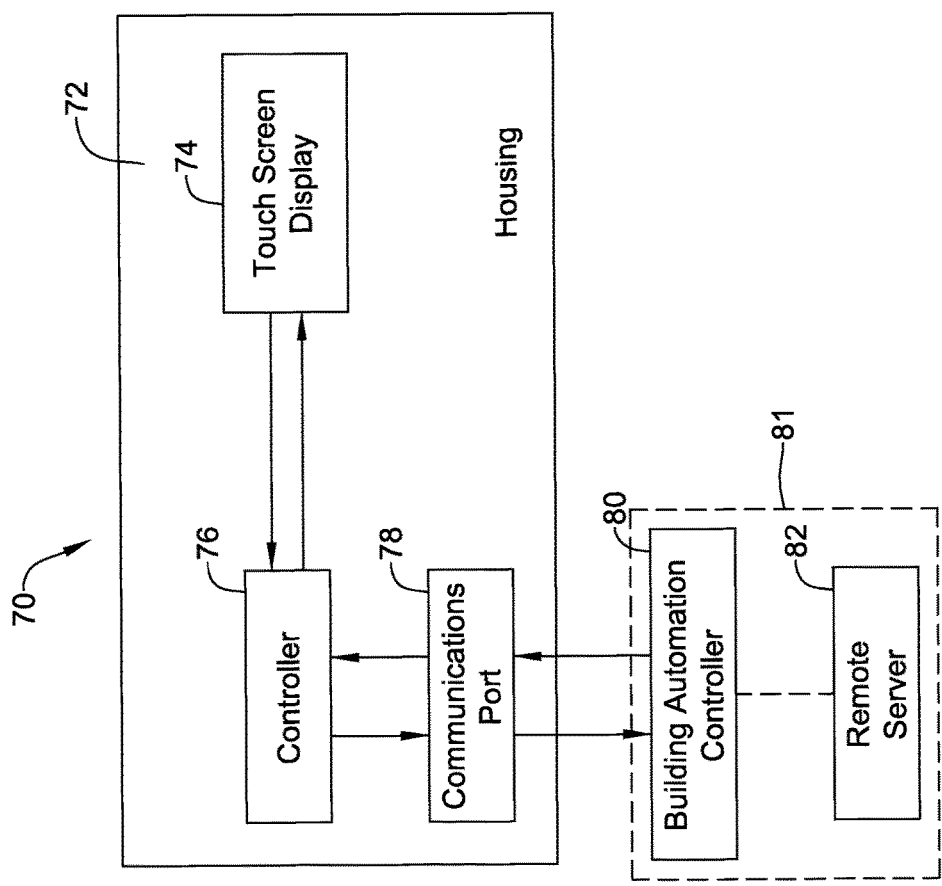
FIG. 7 is a schematic illustration of an illustrative wall module for controlling a feature of a building automation system in accordance with an embodiment of the disclosure.

FIG. 7 provides a schematic diagram of an illustrative wall module 70 that may be considered as representing the wall module 10, although this is not required. The wall module 70 may be configured for controlling a feature of a building automation system, but this is not required. The illustrative wall module 70 includes a housing 72. A touch screen display 74 is mounted relative to the housing 72. In some embodiments, a controller 76 is configured to control what is displayed on the touch screen display 74 and to accept inputs received via the touch screen display 74. A communications port 78 may be operably coupled to the controller 76 such that the wall module 70 is able to communicate with a building automation controller 80 that is remote from the wall module 50. It will be appreciated that in some cases, a single building automation controller 80 may be in communication with a plurality of individual wall modules such as the wall module 70.

In some embodiments, the controller 76 of the wall module 70 is also configured to permit a user to alter a display arrangement of information displayed on the touch screen display 74, and to transmit the altered display arrangement to the building automation controller 80 such that the building automation controller 80 can subsequently provide the altered display arrangement back to the wall module 70. In some cases, the building automation controller 80 may share the altered display arrangement with a remote server 82. The remote server 82 may, for example, provide the altered display arrangement back to the building automation controller 80 and/or the wall module 70 at a future date, and/or may share the altered display arrangement with other building automation controllers and/or wall modules. In some cases, the building automation controller 80 and remote server 82 may be considered a building automation controller, as indicated by dashed line 81, but this is not required.

Figure 8:
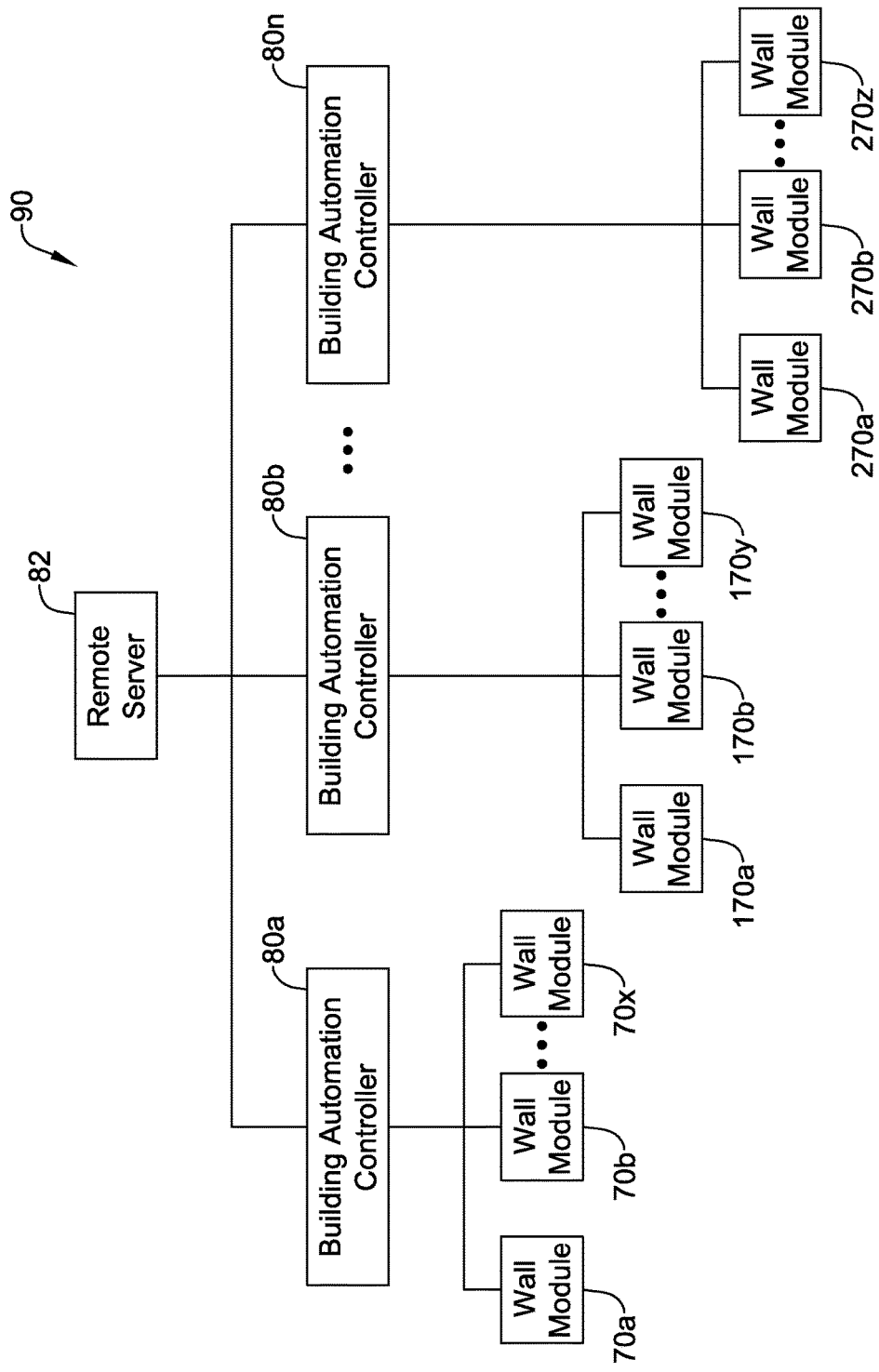
FIG. 8 is a schematic illustration of a building automation controller in accordance with an embodiment of the disclosure.

As alluded to, the remote server 82 may share display arrangements, and possibly other information, with other building automation controllers 80. FIG. 8 provides a schematic illustration of a system 90 in which the remote server 82 is operably coupled or otherwise in communication with a number of different building automation controllers, including a building automation controller 80a, a building automation controller 80b and so on, through a building automation controller 80n. It will be appreciated that "n" may be any integer greater than two in this example. The building automation controller 80a is itself operably coupled or otherwise in communication with a number of wall modules, including a wall module 70a, a wall module 70b and so on through a wall module 70x, where "x" may be any integer greater than two in this example. The building automation controller 80b is itself operably coupled or otherwise in communication with a number of wall modules, including a wall module 170a, a wall module 170b and so on through a wall module 170y, where "y" may be any integer greater than two in this example. The building automation controller 80n, and any other building automation controllers 80c to 80n-1 are themselves operably coupled or otherwise in communication with a number of wall modules, including a wall module 270a, a wall module 270b and so on through a wall module 270z, where "z" may be any integer greater than two in this example.

It will be appreciated that a single remote server, by virtue of being in communication with a number of building automation controllers 80a-80n, each of which are in communication with a number of wall modules, may be in communication with a large number of wall modules. Some of the wall modules may be in the same building, and some of the wall modules may be widely distributed between a number of different buildings. Regardless of how the wall modules are distributed, in some embodiments the remote server 82 may be configured to store display arrangements, including altered display arrangements, from a large number of wall modules and may, in turn, share such display arrangements and altered display arrangements among a number of different building automation controllers and this among a large number of different wall modules. In some cases, the building automation controllers 80a-80n and the remote server 82 may be considered a building automation controller or system, but this is not required.

Figure 9:
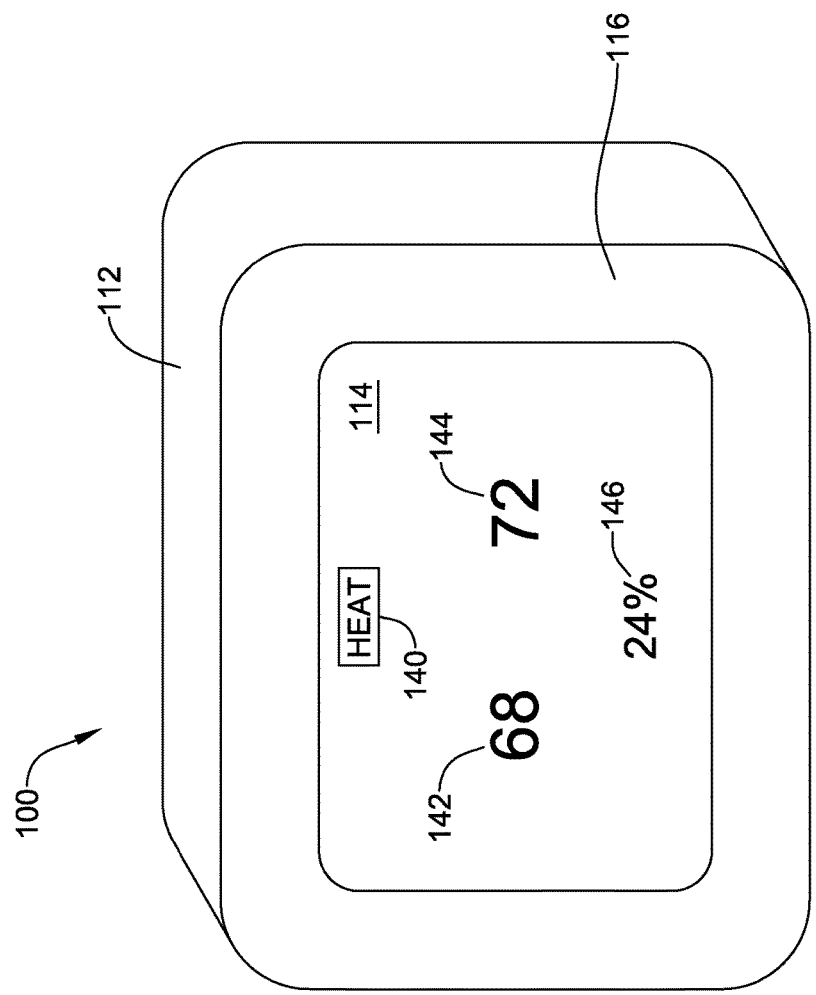
FIG. 9 is a perspective view of an illustrative wall module in accordance with an embodiment of the disclosure.
Figure 10:
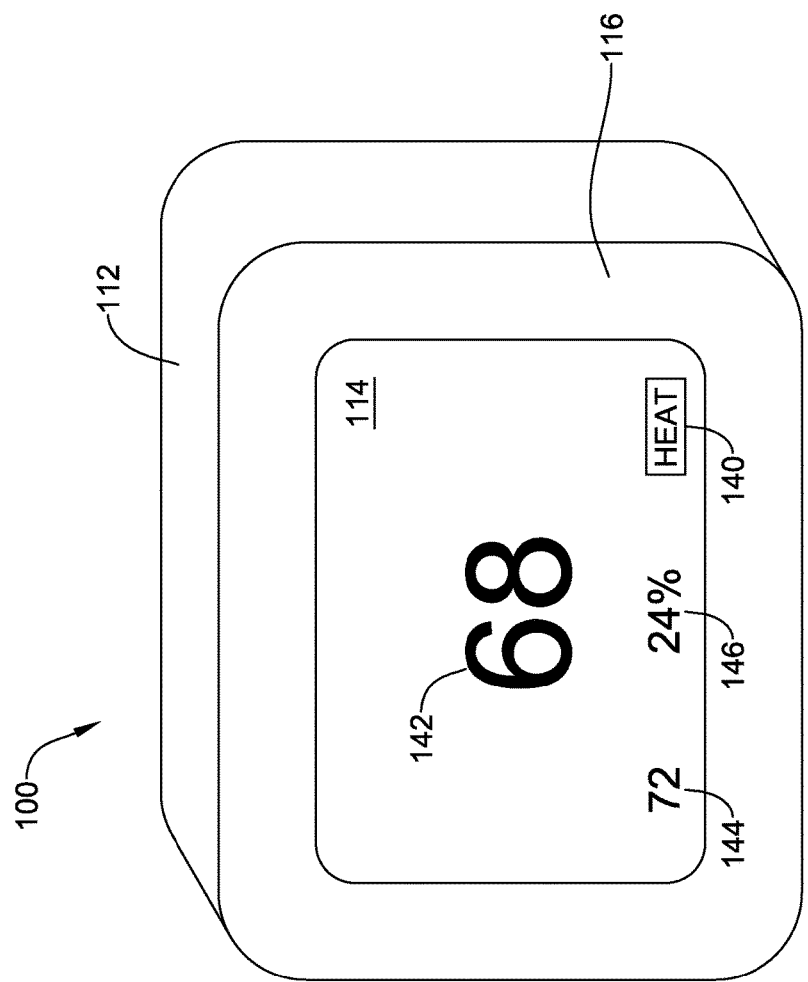
FIG. 10 is a perspective view of the illustrative wall module of FIG. 9, illustrating changes in displayed information.

FIGS. 9 and 10 provide an illustrative but non-limiting example of altering a display arrangement on a wall module intended for use in an HVAC system. FIG. 9 provides a perspective view of a wall module 100 that includes a housing 112 and a touch screen display 114 that is disposed within a front face 116 of the housing 112. Several information objects are displayed on the touch screen display 114. As illustrated, a system status object 140, a current temperature object 142, a temperature setpoint object 144 and a humidity object 146 are currently displayed. This arrangement may be considered as being an original display arrangement, although in some cases this may instead represent a previously customized display arrangement.

While each of these objects 140, 142, 144 and 146 may be considered as providing useful information, an individual may, for example, decide that some data, and thus some objects, are more useful than others. In FIG. 10, it can be seen that the current temperature object 142 has been enlarged and centered on the touch screen display 114, while the system status object 140 has been moved to the bottom of the touch screen display 114. The temperature setpoint object 144 and the humidity object 146, while still displayed, have been reduced in size and moved to the bottom of the touch screen display 114. This is merely an example of how objects may be rearranged into an altered display arrangement. This altered display arrangement may be communicated to a remote building controller and/or server, as discussed above.

FIG. 11 provides a flow diagram of an illustrative method for operating a wall module of a building control system. Information may be displayed on a display of the wall module according to a first display arrangement of information, as generally indicated at block 150. Inputs may be received from a user that alter the first display arrangement of information, resulting in a second display arrangement of information as indicated at block 152. As seen at block 154, the second display arrangement of information may be stored in a memory of the wall module. The second display arrangement of information may be transmitted to a separate remote device that is located remote from the wall module, as generally indicated at block 156. In some embodiments, the second display arrangement of information may optionally be received from the separate remote device, as indicated at block 158. In some cases, the second display arrangement of information may be received from the separate remote device upon power resumption of the wall module and/or upon wall module replacement.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A wall module for controlling a temperature in a building space, the wall module comprising:
   a housing;
   a temperature sensor disposed within the housing;
   a touch screen display mounted relative to the housing;
   a controller configured to control what is displayed on the touch screen display and to accept inputs received from a user via the touch screen display;
   a communication port operatively coupled to the controller for communicating with an HVAC controller that is remote from the wall module; and
   the controller further configured to:
      provide a display arrangement of information on the touch screen;
      accept inputs from the user via the touch screen display altering the display arrangement of information on the touch screen display resulting in an altered display arrangement of information, wherein the altered display arrangement of information includes at least one HVAC control parameter that has been moved and/or resized relative to the display arrangement of information;
      update a display table including display attributes for the at least one HVAC control parameter that has been moved and/or resized, the display attributes including one or more of a display size attribute and a display position attribute;
      transmit the display table to the HVAC controller such that the HVAC controller can store the display table; and
      receive the display table from the HVAC controller, the display table providing the wall module with the altered display arrangement of information for display on the touch screen display.

2. The wall module of claim 1, wherein the HVAC controller is configured to operate in accordance with a programmed schedule, and the wall module communicates a current local temperature to the HVAC controller.

3. The wall module of claim 1, wherein the controller is configured to enable the user to alter the display arrangement of information displayed on the touch screen display by permitting the user to move a location of an HVAC control parameter on the touch screen display via a drag-n-drop gesture and/or to resize an HVAC control parameter on the touch screen display via a pinch gesture.

4. The wall module of claim 1, wherein the controller is configured to enable the user to alter the display arrangement of information displayed on the touch screen display by permitting the user to add an HVAC control parameter on the touch screen display and/or to remove an HVAC control parameter from the touch screen display.

5. The wall module of claim 1, wherein the HVAC controller is configured to communicate the display table describing the altered display arrangement of information to a remote server via a network.

6. The wall module of claim 1, wherein the controller further comprises a memory for storing the display table describing the altered display arrangement of information.

7. The wall module of claim 6, wherein the memory retains one or more display tables that store display attributes relating to each of one or more HVAC control parameter that are to be displayable on the touch screen display, wherein the one or more display tables store at least part of the altered display arrangement of information.

8. The wall module of claim 1, wherein the controller is configured to receive a display table describing an initial display arrangement of information from the HVAC controller upon initial power up of the wall module.

9. The wall module of claim 8, wherein the controller is configured to receive the display table describing the altered display arrangement of information from the HVAC controller upon power resumption and/or wall module replacement.

10. A wall module for controlling a feature of a building automation system, the wall module comprising:
   a housing;
   a touch screen display mounted relative to the housing;
   a controller configured to control what is displayed on the touch screen display and to accept inputs received from a user via the touch screen display;
   a communication port operatively coupled to the controller for communicating with a building automation controller that is remote from the wall module;
   the controller further configured to:
      display a display arrangement of information on the touch screen display;
      receive user inputs via the touch screen display that alter the display arrangement of information displayed on the touch screen display, wherein the altered display arrangement of information includes at least one building automation parameter that has been moved and/or resized relative to the display arrangement of information;
      update a display table including display attributes for the at least one building automation parameter that has been moved and/or resized relative to the display arrangement of information;
      transmit the display table describing the altered display arrangement of information to a remote building automation controller such that the building automation controller can store the display table describing the altered display arrangement of information; and receive the display table describing the altered display arrangement of information from the building automation controller for display of the altered display arrangement on the touch screen display.

11. The wall module of claim 10, wherein the controller is configured to enable the user to alter the display arrangement of information displayed on the touch screen display by permitting a user to move a location of a building automation parameter on the touch screen display via a drag-n-drop gesture and/or by permitting a user to resize a building automation parameter on the touch screen display via a pinch gesture.

12. The wall module of claim 10, wherein the controller is configured to enable the user to alter the display arrangement of information displayed on the touch screen display by permitting the user to add a building automation parameter on the touch screen display and/or by permitting a user to remove a building automation parameter from the touch screen display.

13. The wall module of claim 10, wherein the building automation controller is configured to communicate the altered display arrangement of information to a remote server via a network.

14. The wall module of claim 10, wherein the controller is configured to receive a display table describing an initial display arrangement of information from the building automation controller upon initial power up of the wall module.

15. The wall module of claim 10, wherein the controller is configured to receive the display table describing the altered display arrangement of information from the building automation controller upon power resumption and/or wall module replacement.

16. The wall module of claim 10, wherein the display table describing the display arrangement of information displayed on the touch screen display includes attributes describing an arrangement of two or more building automation parameters on the touch screen display, wherein each building automation parameter has a location attribute that indicates a location of the building automation parameter on the touch screen display and/or a size attribute that indicates a size of the building automation parameter on the touch screen display.

17. The wall module of claim 16, wherein the controller is configured to permit the user to alter one or more of the location attribute and size attribute for one or more of the two or more building automation parameters via the touch screen display.

18. The wall module of claim 10, further comprising one or more of a temperature sensor, a humidity sensor, a carbon dioxide sensor, a carbon monoxide sensor, a volatile organic compound sensor, a light sensor, a movement sensor or a security sensor.

19. A method for operating a wall module of a building control system, the method comprising:

displaying information on a touch screen display of the wall module according to a first display arrangement of information as described in a display table;

receiving inputs from a user that indicate changes in how information is displayed in the first display arrangement of information by engaging with the touch screen display, the inputs altering the first display arrangement of information, resulting in a second display arrangement of information, wherein the second display arrangement of information includes at least one building control parameter that has been moved and/or resized relative to the first display arrangement of information;

updating the display table to update display attributes in order to describe the second display arrangement of information;

storing the display table describing the second display arrangement of information in a memory of the wall module; and transmitting the display table describing the second display arrangement of information to a separate remote device that is located remote from the wall module.

20. The method of claim 19, further comprising:

receiving the display table describing the second display arrangement of information from the separate remote device.

21. The method of claim 20, wherein the receiving step is performed upon power resumption of the wall module and/or upon wall module replacement.

22. A method for operating a building control system including a plurality of wall modules and a building controller remote from the plurality of wall modules, the method comprising:

displaying information on a display of one of the plurality of wall modules according to a display table describing a first display arrangement of information;

receiving inputs from a user that alters the first display arrangement of information, resulting in a second display arrangement of information, wherein the second display arrangement of information includes at least one building control parameter that has been moved and/or resized relative to the first display arrangement of information;

updating the display table to describe the second display arrangement of information;

transmitting the display table describing the second display arrangement of information from the one of the plurality of wall modules to the building controller; and transmitting the display table describing the second display arrangement of information from the building controller to others of the plurality of wall modules.

23. The method of claim 22, wherein the one of the plurality of wall modules is configured to transmit the display table describing the first display arrangement of information to the building controller, which then transmits the display table describing the first display arrangement of information to others of the plurality of wall modules.

* * * * *